United States Patent
Bernhardt et al.

(10) Patent No.: US 9,675,083 B2
(45) Date of Patent: Jun. 13, 2017

(54) METHOD AND DEVICE FOR CREATING BLANKS FROM PIECES OF DOUGH FROM ONE OR MORE WEBS OF DOUGH

(71) Applicant: FRITSCH GMBH, Markt Einerscheim (DE)

(72) Inventors: Udo Bernhardt, Iphofen (DE); Rainer Wagner, Martinsheim (DE)

(73) Assignee: FRITSCH GmbH, Markt Einerscheim (DE)

( * ) Notice: Subject to any disclaimer, the term of this patent is extended or adjusted under 35 U.S.C. 154(b) by 0 days.

(21) Appl. No.: 15/303,511

(22) PCT Filed: Jan. 28, 2015

(86) PCT No.: PCT/DE2015/000025
§ 371 (c)(1),
(2) Date: Oct. 11, 2016

(87) PCT Pub. No.: WO2015/165429
PCT Pub. Date: Nov. 5, 2015

(65) Prior Publication Data
US 2017/0035062 A1    Feb. 9, 2017

(30) Foreign Application Priority Data

Apr. 28, 2014 (DE) .................. 10 2014 005 998

(51) Int. Cl.
*A21D 10/00*    (2006.01)
*A21C 9/08*    (2006.01)
(Continued)

(52) U.S. Cl.
CPC ............ *A21C 9/085* (2013.01); *A21C 11/103* (2013.01); *A21D 8/00* (2013.01); *A21D 8/02* (2013.01)

(58) Field of Classification Search
CPC . A21D 10/00; A21D 8/00; A21D 8/02; A21C 3/10; A21C 9/085; A21C 11/04;
(Continued)

(56) References Cited

U.S. PATENT DOCUMENTS 2,887,964 A * 5/1959 Griner .................... A21C 11/04
425/289
3,880,030 A * 4/1975 Rosengren ............. A21C 11/04
425/291
(Continued)

FOREIGN PATENT DOCUMENTS

EP    0382105 A1    8/1990
EP    0569103 A1    11/1993
(Continued)

*Primary Examiner* — Steven Leff
(74) *Attorney, Agent, or Firm* — Troutman Sanders LLP

(57) ABSTRACT

The invention relates to a device for creating blanks from pieces of dough, in particular triangular pieces of dough, from at least one web of dough, comprising a plurality of cutting tools which cut an edge of the pieces of dough as a result of a movement oriented against the at least one web of dough and comprising a conveyor belt device on which the at least one web of dough is conveyed. The cutting tools are arranged on a drum, which is driven in a rotating manner, via tool holders, said drum being superimposed with a vertical movement such that one or more cutting tools 1 which can be found circulating about the drum are moved parallel to the conveyor belt device as a result of the superimposed sequence of movements of the drum rotation and the vertical movement of the drum.

18 Claims, 8 Drawing Sheets

(51) Int. Cl.
*A21C 11/10* (2006.01)
*A21D 8/00* (2006.01)
*A21D 8/02* (2006.01)

(58) Field of Classification Search
CPC ......... A21C 11/08; A21C 11/10; A21C 11/12;
A21C 11/103; A21C 5/02; A21C 5/08
USPC .............................. 425/294, 298, 301, 305.1
See application file for complete search history.

(56) References Cited

U.S. PATENT DOCUMENTS

| | | | | |
|---|---|---|---|---|
| 4,276,800 | A * | 7/1981 | Koppa | A21C 11/04 |
| | | | | 425/289 |
| 9,408,398 | B2 * | 8/2016 | Kuwabara | B65G 47/26 |
| 2006/0286244 | A1 * | 12/2006 | Fu | A21C 11/04 |
| | | | | 426/549 |
| 2010/0196564 | A1 * | 8/2010 | Cepeda Mendoza | A21C 3/10 |
| | | | | 426/297 |

FOREIGN PATENT DOCUMENTS

| | | | |
|---|---|---|---|
| EP | 0482917 | B1 | 3/1995 |
| EP | 0882400 | B1 | 12/1998 |
| EP | 2172109 | A2 | 4/2010 |
| NL | 7304519 | A | 10/1973 |

* cited by examiner

METHOD AND DEVICE FOR CREATING BLANKS FROM PIECES OF DOUGH FROM ONE OR MORE WEBS OF DOUGH

The invention first of all relates to a device for creating blanks of in particular triangular pieces of dough from at least one sheet of dough, with the further features of the preamble of claim 1.

A device of this type is known, for example, from EP 0 482 917 B1. In this device, the punching or cutting of the sheets of dough and the expansion and the rotation of the cut pieces of dough take place in a plurality of successive steps, which involves the disadvantage that, by means of the separation of the punching/cutting and expansion/rotation operations, an offset or alignment error of the pieces of dough occurs transversely with respect to the direction of movement of the pieces of dough. During the further processing of the pieces of dough, this generally leads to problems, in particular if croissants are intended to be wound from triangular pieces of dough in a subsequent winding device. Similar problems occur in EP 0 382 105 A1, EP 0 569 103 A1 and EP 2 172 109 A2.

For the removal, for the movement apart and for the depositing of the pieces of dough which have been cut out, it is already known from EP 0 882 400 B1 to completely or partially use the cutting means which were used for cutting out the row of pieces of dough at the end of the track and, after the depositing, the cutting means are moved back to the end of the track for renewed cutting out. In the case of the method known from this patent, the cutting means have to be moved back to the end of the track; this necessitates long movement distances which necessitate the additional expansion of the pieces of dough transversely with respect to the direction of movement. In addition, the tool carriers have to be reversed in order, in the case of triangular shapes of pieces of dough, to be able to execute a change in direction of rotation during the movement back of the tool carrier.

Starting from this prior art, the invention is based on the object of designing a device for creating blanks of pieces of dough in such a manner that, with a high degree of accuracy in respect of product size and the deposition positions of the cut products, the operation can be carried out with high cycle outputs, and the device furthermore requires little space, there is clear management of the elements involved, the production costs can be fixed at a relatively low level and only short setup times are required for a change of product.

In addition, the device is intended to provide a possibility of correcting the cut size of the pieces of dough.

This object is achieved by the characterizing features of claim 1; advantageous developments of the invention emerge from the dependent claims.

It is first of all considered to be a core of the invention to arrange the cutting tools via tool carriers on a drum which is driven in a rotating manner and on which a vertical movement is superimposed in such a manner that, by means of the superimposed sequence of movement of the drum rotation and the vertical movement of the drum, one or more cutting tools which are in circulation about the drum are moved parallel to the conveyor belt.

The thus achieved parallel movement of the cutting tools basically makes it possible, during the residence time along the conveying direction of the pieces of dough, to exert a further influence on said pieces of dough after the cutting, for example to expand, or to rotate said pieces of dough or to move or to offset same in another manner in relation to the conveyor belt. Depending on how the cutting tools with their tool carriers are adjusted in terms of speed in relation to the conveyor belt, in particular in relation to a removal conveyor belt, the pieces of dough can be spaced apart from one another after the cutting operation. By means of an additionally superimposed sideways movement of the tool carriers, or a rotation about a vertical axis, it is possible to rotate or to align the cut pieces of dough so that the pieces of dough are optimally deposited on a removal conveyor belt for a subsequent processing operation.

In an advantageous development, a plurality of cutting tools are assigned to common tool carriers which are assigned thereto and are rotatably driven, and mounted, within the drum, which is driven in a rotating manner, in such a manner that the cutting tools face toward the at least one sheet of dough at least during the cutting operation.

An arrangement of this type makes it possible for the cutting tools, during their guidance parallel to the conveyor belt, to face with their cutting edges precisely parallel downward toward the conveyor belt and therefore to have an optimum engagement in the sheets of dough or pieces of dough which are to be cut or have already been cut. After completion of the cutting operation, a rotational movement about a vertical axis is superimposed on the cutting tools such that the cutting tools and engagement elements for the dough that are optionally fastened with said cutting tools to a tool carrier can execute a rotation of the cut-off dough elements about a vertical axis. In order to trigger said rotational movement about the vertical axis, a control element is provided in the region of the tool carrier, said control element being mounted so as to be movably displaceable parallel to the axis of rotation of the drum, and the horizontal control movement of said control element takes place by means of a curved track acting on said control element. The curved track can be arranged laterally in the region of the side regions of the drum and acts on the end portions of the control elements which are designed in the manner of rods and to which the tool carriers are coupled.

The vertical movement of the drum, which vertical movement together with the rotational movement of the drum leads to the cutting tools being guided in parallel along the conveyor belt, can be controlled in a particularly advantageous manner by means of at least one slotted guide track which is advantageously provided in the side region of the drum. So that the drum as a whole can execute a vertical movement above the conveyor belt, the drum is mounted via pivot arms on a pivot spindle which is spaced apart from the axis of rotation of said drum. The drum can therefore execute a "breathing" movement, as it were, in relation to the conveyor belt which moves along therebelow, in such a manner that, after the engagement of the cutting tools in the sheets of dough, during the rotation, i.e. the passage of the cutting tools below the drum spindle, the latter is raised in such a manner that the cutting tools are guided equidistantly over the surface of the conveyor belt. The guidance can be carried out precisely such that, directly after the actual cutting operation, the cutting tools or the tool sets carrying the latter are slightly raised, which leads to the pieces of dough which have been separated off by the cutting being able to be released somewhat from the surface of the conveyor belt and thereby being able to be rotated or offset more easily on the surface of the conveyor belt. The tool inserts which carry the cutting tools can be provided with downwardly pointing, needle-like drivers which engage in the cut pieces of dough and ensure a reliable offset or a reliable rotation of the pieces of dough.

The drivers, because of their adhesion in the dough, also slightly raise the pieces of dough such that the latter can be lifted from the surface of the conveyor belt.

Two groups of cutting tools can be arranged on the drum, wherein one group of cutting tools executes a right-rotating movement after the cutting operation and the other group of cutting tools executes a left-rotating movement after the cutting operation, wherein, however, it is noted that the two groups of cutting tools can be distributed over an even number of tool carriers. For example, it is therefore possible to arrange two, four, six or eight tool carriers or even a greater number of tool carriers having a respective row of cutting tools on the drum.

As is customary in the case of devices of this type, the conveyor belt device can have at least one supply conveyor belt and at least one removal conveyor belt, wherein the supply conveyor belt ends in the region under the drum and merges into the removal conveyor belt. The speed of the removal conveyor belt is adjustable relative to the speed of the supply conveyor belt and is generally higher than that of the supply conveyor belt in order to achieve an expansion of the pieces of dough in the removal direction.

The rotational speed of the drum relative to the speed of the conveyor belts is also adjustable and the size of the cut pieces of dough can thereby be influenced.

The vertical movement of the drum can be controlled—as already explained above—by means of guide slots, in particular in the side region of the drum; however, it is also possible to allow the vertical movement to take place by means of an electric, hydraulic or pneumatic drive which raises or lowers the drum spindle in the desired manner.

The invention also relates to a method for creating blanks of in particular triangular pieces of dough from one or more sheets of dough, wherein a plurality of cutting tools, as a result of a movement directed against the sheet of dough, cut an edge of the pieces of dough, and at least one conveyor belt device is provided for conveying the at least one sheet of dough.

According to the method, it is provided that a first group of cutting tools cuts a first edge of the piece of dough and, during the engagement of the cutting tools, the cutting tools are moved parallel to the conveyor belt by means of a superimposed sequence of movement of a drum rotation and a vertical movement of the drum, and a rotation of the piece of dough cut off from the at least one sheet of dough takes place during this parallel movement. During the rotation, the pieces of dough can be lifted somewhat from the conveyor track, and the first group of cutting blades causes a left rotation of the pieces of dough and a subsequent group of cutting blades causes a right-rotating movement of the pieces of dough.

The invention is explained in more detail with reference to exemplary embodiments in the figures of the drawing, in which.

Figure 1:
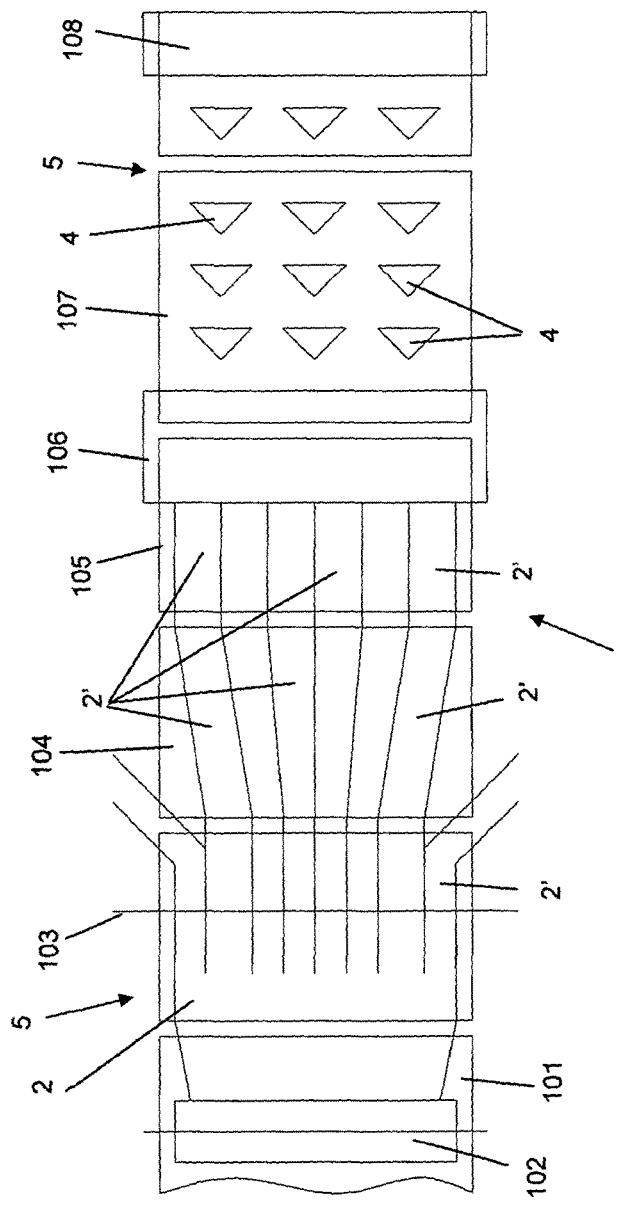
FIG. 1 shows a schematic top view of a device according to the invention.

The device 100 (only illustrated schematically in its entirety in FIG. 1 and FIG. 2) for creating blanks of pieces of dough 4 from at least one sheet of dough 2, 2' has a plurality of cutting tools 1 which, as a result of a movement directed against the at least one sheet of dough 2, cut an edge 3 of the pieces of dough 4, wherein the sheet of dough 2 or the pieces of dough 4 are conveyed on a conveyor belt device 5.

In addition, the entire device 100 has dough rollers 102 for rolling out the sheet of dough 2 and a cutting device 103 in order to separate the sheet of dough 2 into sheets of dough 2' lying next to one another.

Said sheets of dough 2' lying next to one another are brought into a laterally spaced-apart position on what is referred to as an expansion table 104 and then move via a supply table 105 into a cutting device 106 in which the drum 7 with the cutting tools 1 is accommodated in order to cut the pieces of dough 4. Said cut pieces of dough 4 are then brought via a removal table 107 to a winding station 108 connected downstream.

According to the core of the invention, the cutting tools 1 are arranged via tool carriers 6 on a drum 7, which is driven in a rotating manner and on which a vertical movement 8 is superimposed in such a manner that, by means of the superimposed sequence of movement of the drum rotations 9 and the vertical movement 8, one or more cutting tools 1 which are in circulation around the drum 7 are moved parallel to the conveyor belts 10 of the conveyor belt device 5, which conveyor belts are arranged under the drum 7. The cutting tools 1 are fastened for this purpose in an advantageous manner on the tool carriers which are assigned thereto and are driven rotatably, and mounted, within the drum 7, which is driven in a rotating manner, in such a manner that the cutting tools 1 are directed downward at least during the cutting operation, i.e. during the engagement in the at least one sheet of dough 2'.

After completion of the actual cutting operation and of an expansion operation in relation to the incoming strip of dough, the cutting tools 1 execute a rotational movement about a vertical axis 11, wherein, in order to trigger the rotational movement, the cutting tools are driven in the region of the tool carrier via a control element 12 which is mounted so as to be movably displaceable parallel to the axis of rotation 13 of the drum 7.

The horizontal control movement of the control element 12 for the tool carriers 6 takes place by means of a curved track 14 which acts on the end of the control element 12 and is sensed by a sensing element 15 which is connected by a lever to the end of the rod-like control elements 12.

The vertical movement up and down of the drum 7 is controlled in the exemplary embodiment by means of curved tracks 16 which are arranged in the side regions 17 of the drum 7 and can form, as it were, the side walls of the drum 7. So that the drum 7 can be moved upward and downward, the drum 7 is mounted via pivot arms 18 on a pivot spindle 19 which is spaced apart from the axis of rotation 13 of said drum.

Two groups of cutting tools 1 are arranged on the drum 7; a first group of cutting tools 11a executes a right-rotating movement after the cutting operation, and a second group of cutting tools 21b executes a left-rotating movement after the cutting operation. These alternative rotations to the right and to the left lead to the fact that pieces of dough which, in the exemplary embodiment, are triangular are all aligned, after the cutting of their edges, in such a manner that they firstly point with a triangle base in the removal direction and are secondly oriented one behind another on the conveyor belt in a plurality of rows—depending on the number of cutting tools per tool carrier—and can thus be transported away in a row.

The cutting tools 1 are arranged on tool inserts 20 which are provided with downwardly pointing dough engagement projections 21 in order to ensure a reliable rotation of the cut-off pieces of dough 4.

In a customary manner, the conveyor belt device 5 has at least one supply conveyor belt 22 and at least the removal conveyor belt 10 that has already been mentioned, wherein the supply conveyor belt 22 ends in the region under the drum 7 and merges into the removal conveyor belt 10, the speed of which can be adjusted relative to the speed of the supply conveyor belt 22. The rotational speed of the drum 7 is, for its part, adjustable relative to the speed of the removal conveyor belt 10 and of the supply conveyor belt 22.

The cut pieces of dough 4 are rotated in relation to the surface of the supply and removal conveyor belt 22, 10 by means of the dough engagement projections 21 and by means of the cutting tools 1 and are lifted from the respective surface of the conveyor belt of the supply or removal conveyor belt 22, 10.

Figure 2:
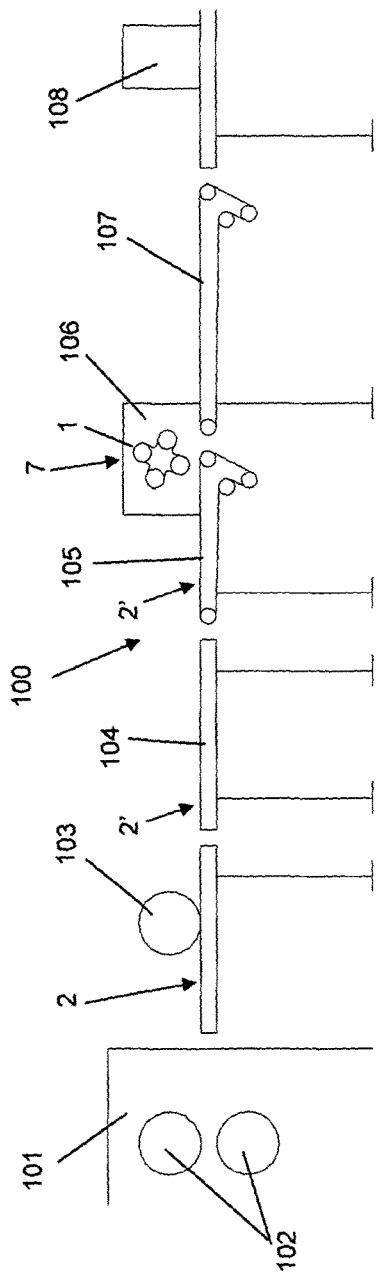
FIG. 2 shows a schematic side view of the device according to FIG. 1.
Figure 3:
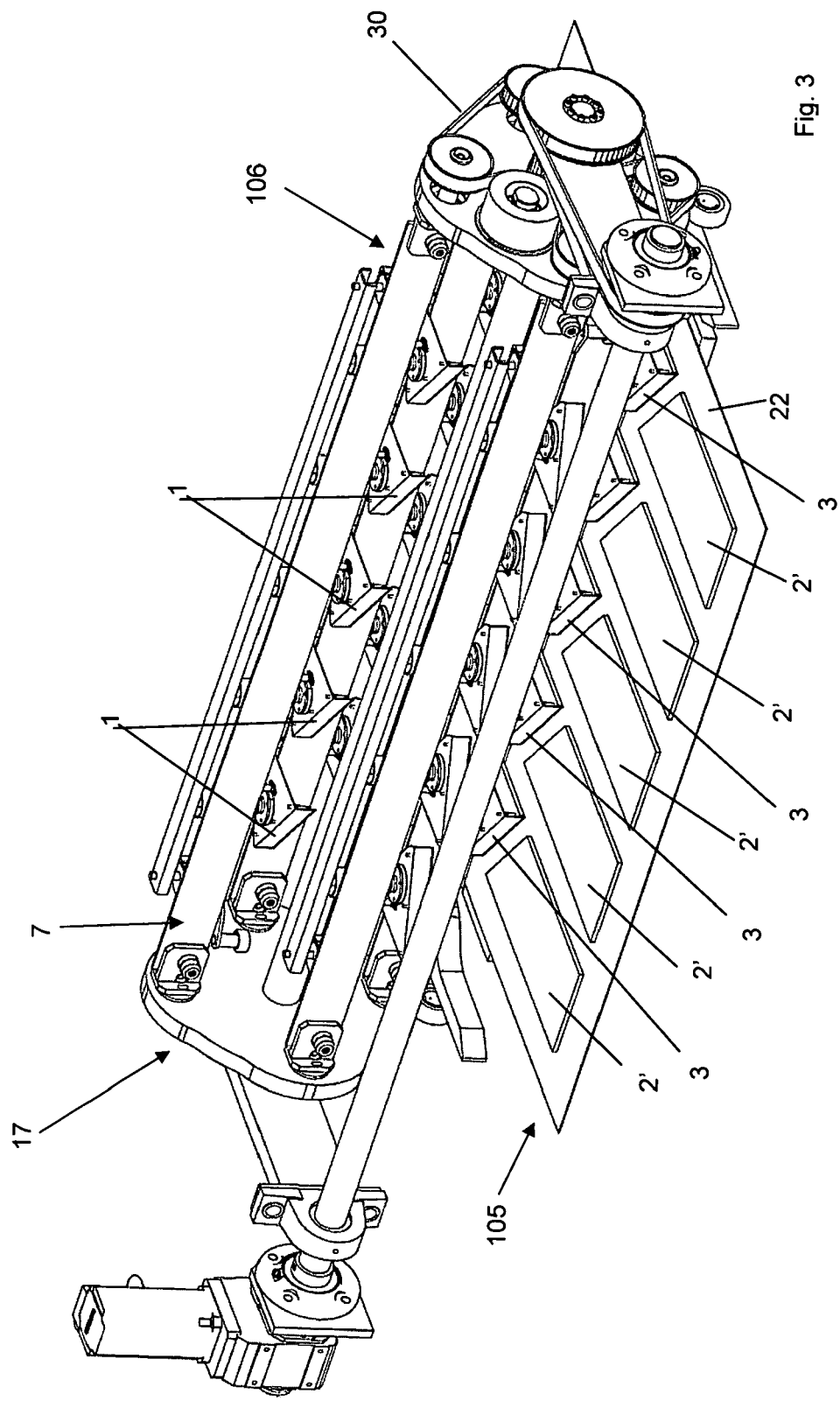
FIG. 3 shows a perspective detailed view of the cutting tool drum, which is provided in the device, with its position elements and the cutting tools arranged therein.
Figure 4:
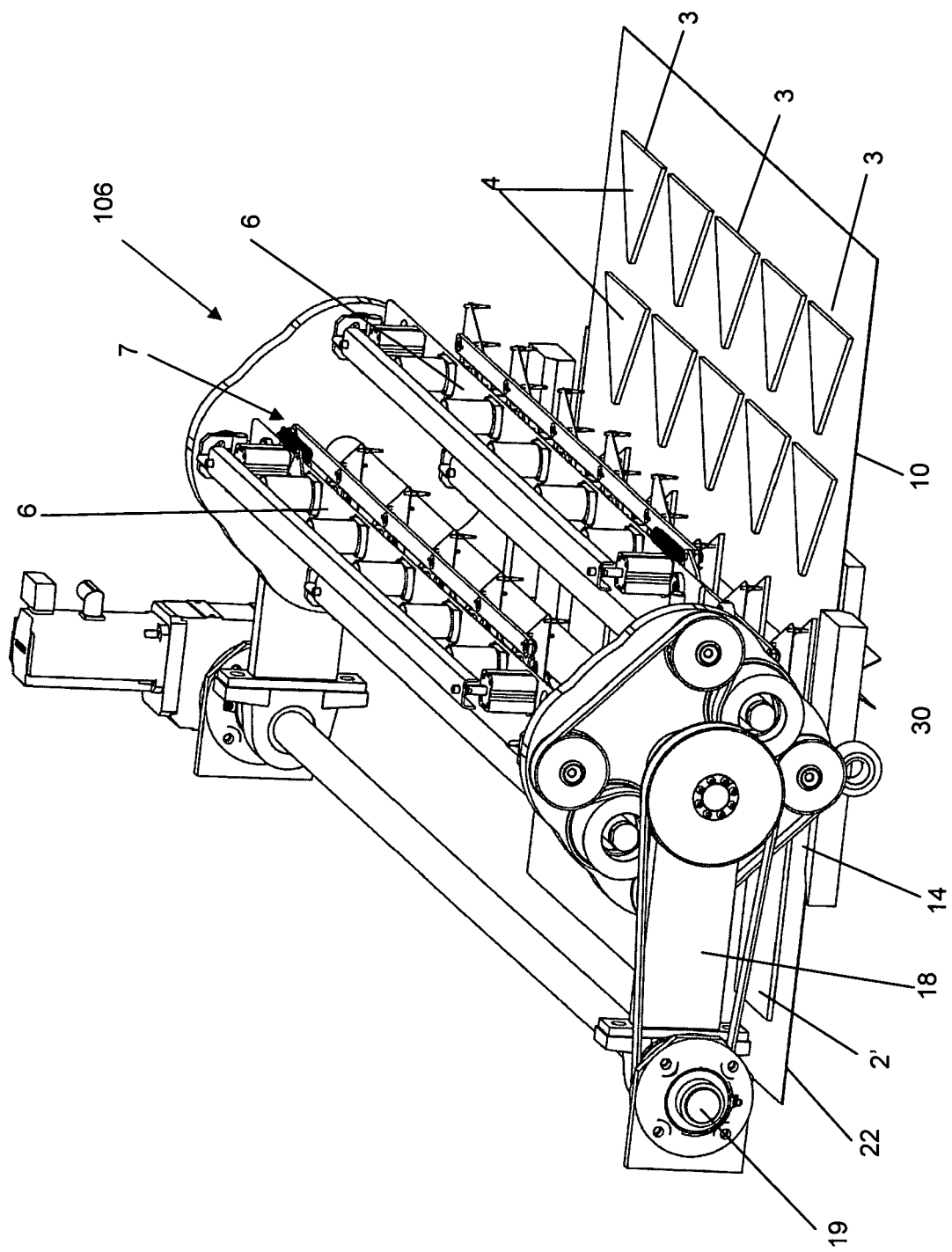
FIG. 4 shows a further perspective view of the cutting tool drum arranged in the device.
Figure 5:
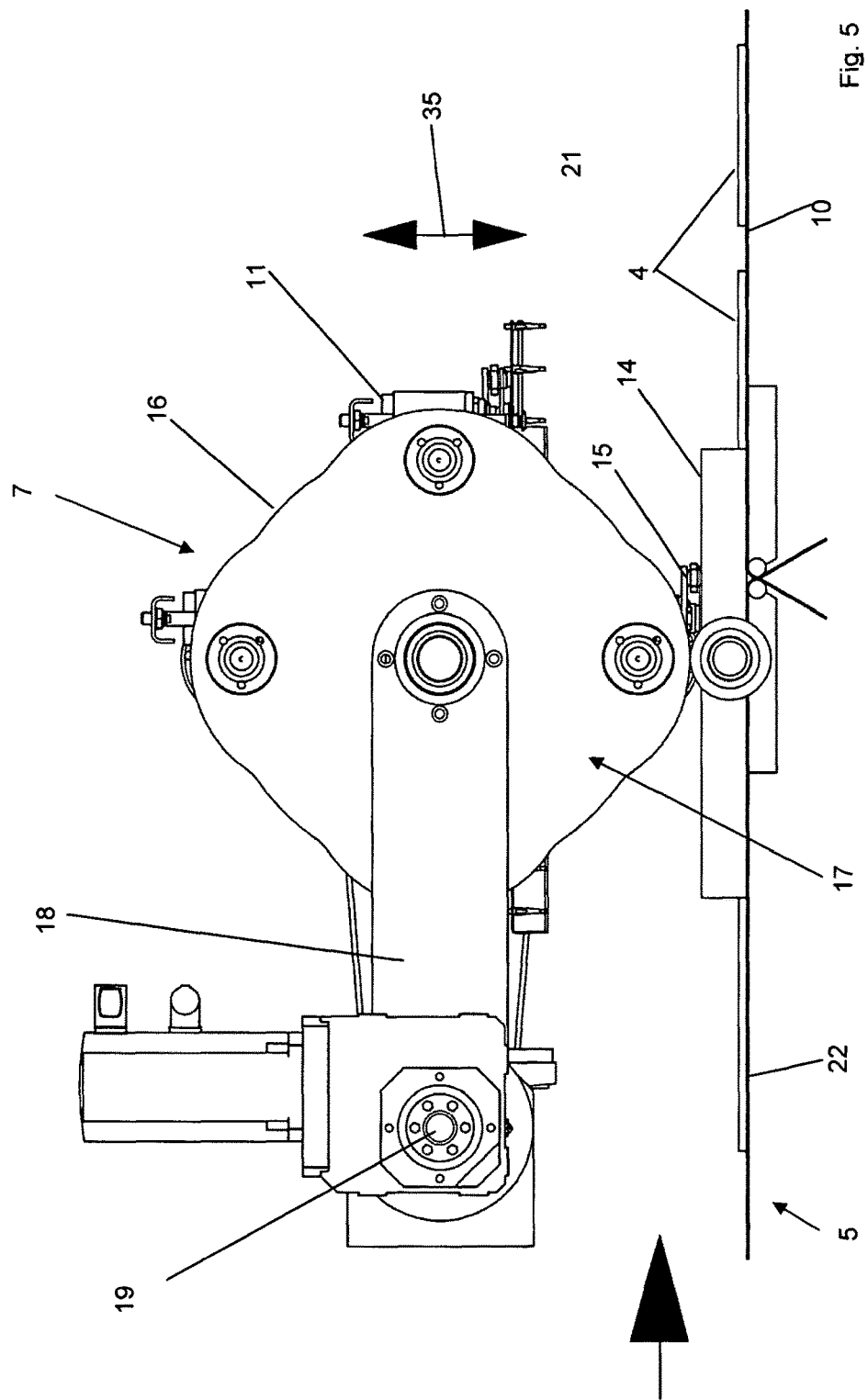
FIG. 5 shows a side view of the cutting tool drum.
Figure 6:
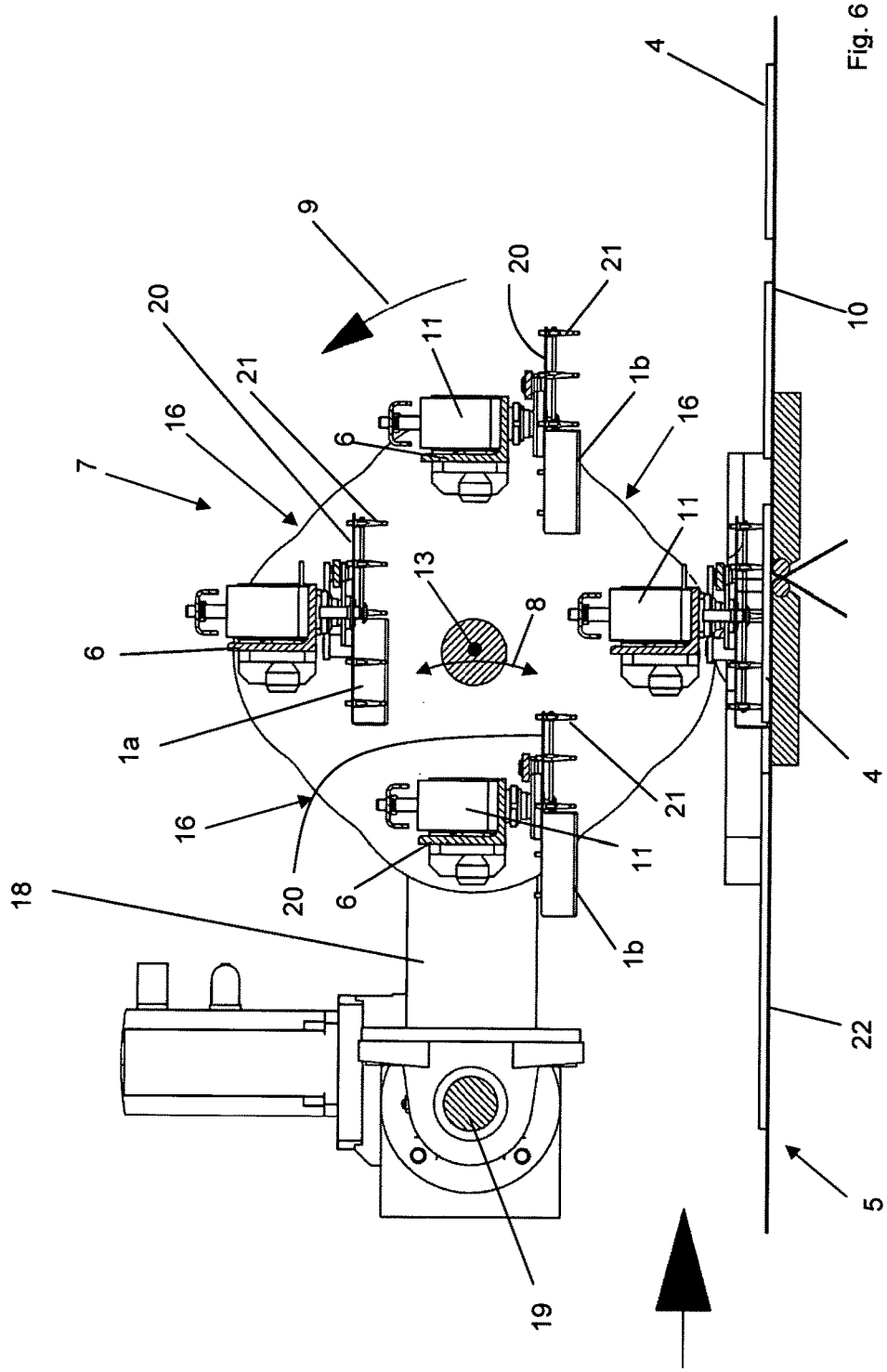
FIG. 6 shows a section through the cutting tool drum and the conveyor belts, which are located therebelow, at a right angle to the drum spindle.

In the case of the method which can be carried out by a device of this type, a first group of cutting tools 1a cuts a first edge of the piece of dough 4 and a second subsequent group of cutting tools 1b cuts a second edge of the piece of dough 4. During the engagement of the cutting tools 1, a parallel movement of the cutting tools 1 relative to the conveyor belt 10, 22 is achieved by the superimposed sequence of movement of the drum rotation and the vertical movement of the drum 7, and a rotation of the piece of dough 4, which has been cut off from the at least one sheet of dough, about a vertical axis takes place during said parallel movement in such a manner that the pieces of dough, as is visible particularly clearly in FIG. 2, are removed with a triangle base in the conveying direction 24.

The rotation of the tool carriers 6 within the drum 7 is achieved by belt drives 30 which are arranged in a side region of the drum 7 and ensure that the cutting blades are directed downward during the drum rotation.

Figure 8:
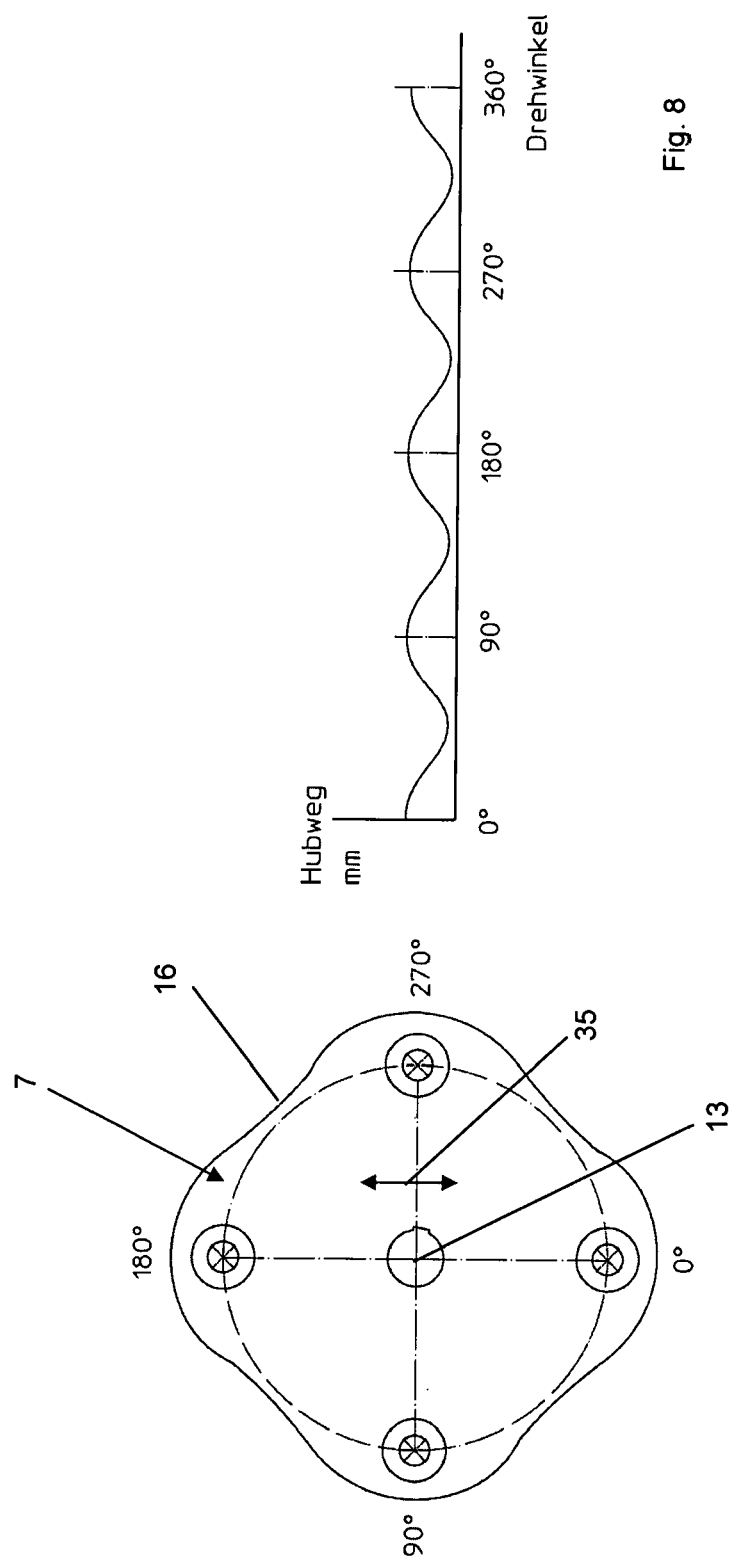
FIG. 8 shows a schematic illustration of the slotted guide track arranged in the side region of the drum and of the lifting distance, which is caused by said slotted guide track, of the drum spindle with respect to the angle of rotation of the cutting tool drum.
Figure 9:
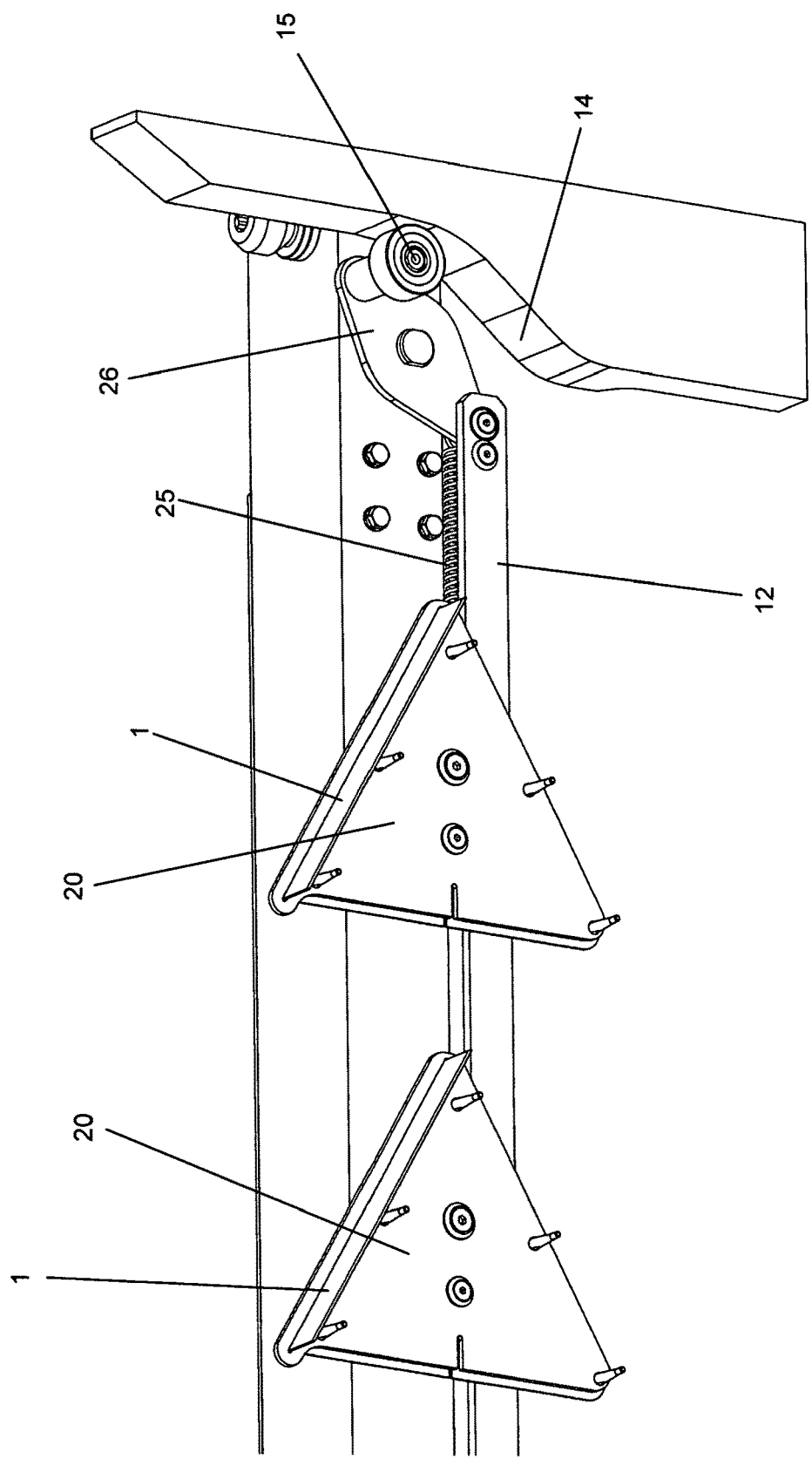
FIG. 9 shows a schematic illustration of the cutting tools arranged on tool carriers and the coupling of said cutting tools in order to trigger a slotted-guide-controlled rotational movement about a vertical axis.

FIG. 8 once more illustrates how the movement up and down 35 of the axis of rotation 13 is controlled by the curved tracks 16 in the side region of the drum 7. The superimposed rotation of the drum 7 and its movement up and down 35 lead to the cutting blades being guided substantially horizontally during their engagement in the dough, as a result of which a reliable rotation and orientation of the pieces of dough can take place.

Figure 7:
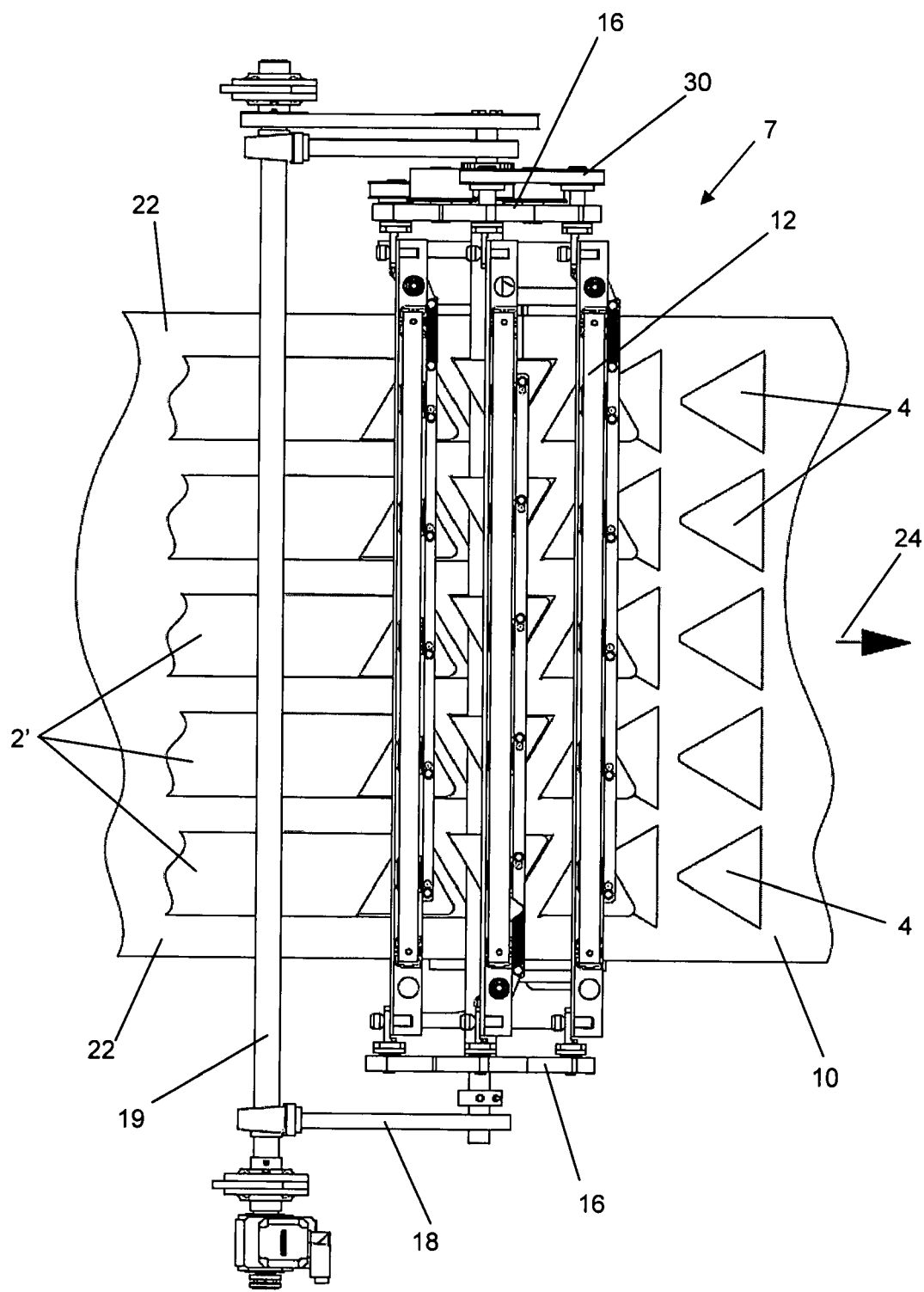
FIG. 7 shows a top view of the drum arranged above the conveyor belts.

It can clearly be seen in FIG. 7 how the tool inserts 20 are fastened to the tool carriers and can be rotated via the control element 12. The control element 12 is connected via an intermediate element 26, with the pretensioning of a spring 25, to a sensing element 15 which rolls along the curved track 14 and therefore undertakes a collective rotation of the tool inserts 20 about the vertical axes.

LIST OF REFERENCE SIGNS

1 Cutting tool
1a Group of cutting tools 1
1b Group of cutting tools 2
2,2' Sheet of dough
3 Edge
4 Piece of dough
5 Conveyor belt device
6 Tool carrier
7 Drum
8 Movement (vertically)
9 Drum rotation
10 Removal conveyor belt
11 Vertical axis
12 Control element
13 Axis of rotation of 7
14 Curved track
15 Sensing element
16 Slotted guide track
17 Side region
18 Pivot arms
19 Pivot spindle of 7
20 Tool insert
21 Dough engagement projections
22 Supply conveyor belt
24 Conveying direction
30 Belt drive
35 Movement up and down
100 Device
102 Dough rollers
103 Cutting device
104 Expansion table
105 Supply table
106 Cutting device
107 Removal table
108 Winding station

The invention claimed is:

1. A device (100) for creating blanks of triangular pieces of dough (4) from at least one sheet of dough (2), comprising
a plurality of cutting tools (1) which, as a result of a movement directed against the at least one sheet of dough (2'), cut an edge (3) of the pieces of dough (4), and
a conveyor belt device (5) on which the at least one sheet of dough (2) is conveyed, characterized in that the cutting tools (1) are arranged via tool carriers (6) on a drum (7) which is driven in a rotating manner and on which a vertical movement (8) is superimposed in such a manner that, by means of the superimposed sequence of movement of the drum rotation (9) and the vertical movement of the drum (7), one or more cutting tools (1) which are in circulation around the drum (7) are moved parallel to the conveyor belt device (5).

2. The device as claimed in claim 1, characterized in that a plurality of cutting tools (1) are fastened on the tool carriers (6) which are assigned thereto and are driven rotatably, and mounted, within the drum (7), which is driven in a rotating manner, in such a manner that the cutting tools (1) face toward the at least one sheet of dough (2) at least during the cutting operation.

3. The device as claimed in claim 1, characterized in that, after completion of the cutting operation, the cutting tools (1) execute a rotational movement about a vertical axis (11).

4. The device as claimed in claim 3, characterized in that, in order to trigger the rotational movement of the cutting tools (1) which are coupled in a vertically rotatable manner, a control element (12) is mounted in the region of the tool carrier (6) so as to be movably displaceable parallel to the axis of rotation of the drum (7).

5. The device as claimed in claim 1, characterized in that the horizontal control movement of the control element (12) of the tool carrier (6) takes place by means of a curved track (14) acting on said control element.

6. The device as claimed in claim 1, characterized in that the vertical movement of the drum (7) is controllable by means of at least one slotted guide track (16).

7. The device as claimed in claim 6, characterized in that the at least one slotted guide track (16) is arranged in the side region (17) of the drum (7).

8. The device as claimed in claim 1, characterized in that, for the vertical movement, the drum (7) is mounted via pivot arms (18) on a pivot spindle (19) which is spaced apart from the axis of rotation (13) of said drum.

9. The device as claimed in claim 1, characterized in that two groups of cutting tools (1) are arranged on the drum (7), wherein one group of cutting tools (1a) executes a right-rotating movement about a substantially vertical axis after the cutting operation and the other group of cutting tools (1b) executes a left-rotating movement about a substantially vertical axis after the cutting operation.

10. The device as claimed in claim 1, characterized in that the cutting tools (1) are arranged on tool inserts (20) which are provided with downwardly pointing dough engagement projections (21).

11. The device as claimed in claim 1, characterized in that the conveyor belt device (5) has at least one supply conveyor belt (22) and at least one removal conveyor belt (10), wherein the supply conveyor belt (22) ends in the region below the drum (7) and merges into the removal conveyor belt (10), the speed of which is adjustable relative to the speed of the supply conveyor belt (22).

12. The device as claimed in claim 1, characterized in that the rotational speed of the drum (7) relative to the speed of the conveyor belts (10, 22) is controllable.

13. The device as claimed in claim 1, characterized in that the cut pieces of dough (4) are rotatable in relation to the surface of the conveyor belt (22, 10) and/or are liftable from the surface of the conveyor belt by means of the dough engagement projections (21).

14. The device as claimed in claim 1, characterized in that the vertical movement (8) of the drum (7) takes place by means of an electric, hydraulic or pneumatic controllable drive.

15. A method for creating blanks of triangular pieces of dough (4) from one or more sheets of dough (2, 2'), comprising the following features:
  providing a plurality of cutting tools (1) which, as a result of a movement directed against the sheet of dough (2'), cut an edge of the pieces of dough (4);
  providing at least one conveyor belt device (5) for conveying the at least one sheet of dough (2, 2'), characterized in that a first group of cutting tools (1a) cuts a first edge (3) of the piece of dough (4), wherein, during the engagement of the cutting tools (1), the cutting tools (1) are moved parallel to the conveyor belt (10, 22) by means of a superimposed sequence of movement of a drum rotation (9) and a vertical movement (8) of the drum (7), and a rotation of the pieces of dough (4) cut off from the at least one sheet of dough takes place during said parallel movement.

16. The method as claimed in claim 15, characterized in that, during the rotation, the pieces of dough (4) are lifted from the conveyor track.

17. The method as claimed in claim 15, characterized in that a left rotation of the pieces of dough (4) takes place in conjunction with a first group of cutting tools (1a) and a right rotation of the pieces of dough (4) takes place in conjunction with a subsequent group of cutting tools (1b).

18. The method as claimed in claim 15, characterized in that the rotated pieces of dough (4) are conveyed away in one or more lines lying one behind another on the conveyor belt (10).

\* \* \* \* \*